United States Patent
Huang et al.

(10) Patent No.: US 11,479,126 B2
(45) Date of Patent: Oct. 25, 2022

(54) SYSTEM AND METHOD FOR COMPENSATING ACCELERATION OF ELECTRICAL MOTORBIKE

(71) Applicants: Delta Electronics, Inc., Taoyuan (TW); KWANG YANG MOTOR CO., LTD., Kaohsiung (TW)

(72) Inventors: Chien-Ping Huang, Taoyuan (TW); Chung-An Hsieh, Taoyuan (TW); Hsiang-Hsi Huang, Kaohsiung (TW); Cheng-Hsien Huang, Kaohsiung (TW)

(73) Assignees: DELTA ELECTRONICS, INC., Taoyuan (TW); KWANG YANG MOTOR CO., LTD., Kaohsiung (TW)

( * ) Notice: Subject to any disclaimer, the term of this patent is extended or adjusted under 35 U.S.C. 154(b) by 529 days.

(21) Appl. No.: 16/524,000

(22) Filed: Jul. 26, 2019

(65) Prior Publication Data
US 2020/0307388 A1 Oct. 1, 2020

(30) Foreign Application Priority Data
Mar. 28, 2019 (CN) .......................... 201910243629.1

(51) Int. Cl.
*B60L 15/20* (2006.01)
*B60L 50/50* (2019.01)

(52) U.S. Cl.
CPC .............. *B60L 15/20* (2013.01); *B60L 50/50* (2019.02); *B60L 2200/12* (2013.01); *B60L 2240/10* (2013.01)

(58) Field of Classification Search
CPC .... B60L 15/20; B60L 15/2072; B60L 15/209; B60L 2200/12; B60L 2240/10;
(Continued)

(56) References Cited

U.S. PATENT DOCUMENTS 5,631,833 A * 5/1997 Wada .................. B62D 5/0463
701/42
8,825,339 B2 * 9/2014 Shono ............. B60W 30/18072
701/93
(Continued)

FOREIGN PATENT DOCUMENTS

| CN | 102892618 B | 5/2015 |
| CN | 106740269 A | 5/2017 |
| CN | 107131296 A | 9/2017 |

OTHER PUBLICATIONS

Office Action dated Oct. 18, 2019 of the corresponding Taiwan patent application No. 108111043.
(Continued)

*Primary Examiner* — Hunter B Lonsberry
*Assistant Examiner* — Daniel L Greene
(74) *Attorney, Agent, or Firm* — Chun-Ming Shih; HDLS IPR Services

(57) ABSTRACT

A system for compensating acceleration of electrical motorbike includes a throttle unit and an electro-mechanic assembly. After the electrical motorbike starts, the throttle unit receives external operation from a rider for generating a series of original throttle signal. An acceleration compensating module calculates a throttle variation rate based on the original throttle signal and variation of a throttle operation magnitude, and calculates a throttle compensating value based on the throttle variation rate when the throttle variation rate is larger than or equal to a correction threshold. A throttle compensating module receives and sums the original throttle signal and the throttle compensating value up for generating a new throttle signal. A torque controller generates a corresponding torque command based on the new throttle signal, and outputs the torque command to the electro-mechanic assembly for operation.

18 Claims, 14 Drawing Sheets

(58) Field of Classification Search
CPC .......... B60L 2240/16; B60L 2240/423; B60L 2240/463; B60L 2260/26; B60L 2260/50; B60L 50/50; Y02T 10/64; Y02T 10/72
See application file for complete search history.

(56) References Cited

U.S. PATENT DOCUMENTS

| | | | |
|---|---|---|---|
| 9,002,556 B2 | 4/2015 | Nakamura et al. | |
| 2003/0226542 A1* | 12/2003 | Hoshino | F02D 35/0007 123/399 |
| 2004/0035393 A1* | 2/2004 | Ishiguro | F02D 11/105 123/399 |
| 2004/0060751 A1* | 4/2004 | Frank | B60L 50/61 180/65.21 |
| 2006/0180363 A1 | 8/2006 | Uchisasai et al. | |
| 2014/0074368 A1* | 3/2014 | Stares | B60K 17/35 701/69 |
| 2016/0377004 A1* | 12/2016 | Yokono | F02D 41/18 701/103 |
| 2017/0030270 A1* | 2/2017 | Tipton | F02D 11/02 |
| 2018/0112605 A1* | 4/2018 | Ryan | F02D 11/02 |

OTHER PUBLICATIONS

Office Action dated May 25, 2021 of the corresponding China patent application No. 201910243629.1.
Search Report dated Aug. 19, 2020 of the corresponding European patent application No. 20165136.1.

* cited by examiner

SYSTEM AND METHOD FOR COMPENSATING ACCELERATION OF ELECTRICAL MOTORBIKE

BACKGROUND OF THE INVENTION

Technical Field

The present invention relates to electrical motorbike, especially to system and method for compensating acceleration of electrical motorbike.

Description of Related Art

The technologies of electric vehicles have rapid development owing to environmental concern and progress in power electronics. Among the electric vehicles, the electrical motorbike has wide application and promising market prospect. Besides, the cost and technique threshold of electrical motorbike is lower with respect to electrical car; this contributes to its faster development.

However, the conventional fuel-based or internal combustion engine (ICE) motorbike has better manipulation and riding feeling than that of the electrical motorbike because the conventional fuel-based motorbike has different transmission characteristics and nature of power curve of fuel-based engine. Besides, the conventional fuel-based motorbike uses automatic transmission such as continuously variable transmission (CVT). It is the obstacles (i.e., manipulation and riding feeling) the electrical motorbike needs to overcome to compete with the conventional fuel-based motorbike for riding considerations.

More particularly, the fuel-based motorbike can get larger output torque within shorter time by the compensation mechanisms of its engine (control) chip, thus the rider of the fuel-based motorbike can feel more thrusting acceleration. On the contrary, the electrical motorbike accelerates through basically a linear power curve. This renders the rider with precise control of speed; however, the riding feeling is too smooth to lack sense of thrusting acceleration.

FIGS. 1A and 1B respectively show the block diagram and acceleration curve for the related art electrical motorbike.

As shown in FIG. 1, the related art electrical motorbike 1 mainly comprises a throttle unit 11, a torque controller 12 and an electro-mechanic assembly 13, where the electro-mechanic assembly 13 may comprise, for example but not limited to, a battery and a motor and so on.

Upon receiving the operation or manipulation from the rider, the throttle unit 11 thus outputs a throttle signal TPS to the torque controller 12, and then the torque controller 12 generates the corresponding torque command TqCmd based on the throttle signal TPS and outputs the torque command TqCmd to the electro-mechanic assembly 13 to control the movement of the electrical motorbike 1.

As shown in FIG. 1B, in related art electrical motorbike 1, the throttle signal is corresponding to proportional torque command TqCmd in any one of the riding operation regions. The acceleration curve of the related art electrical motorbike 1 is relatively linear such that the related art electrical motorbike 1 cannot provide thrusting acceleration when the rider needs rapid acceleration.

In related art electrical motorbikes, part of them adopts quadratic curve or multiple points trinucleotides (T-N) curve to provide more flexible output. However, the characteristics provided by those designs still cannot compete with the fuel-based motorbike (especially, which adopts engine chips) in terms of thrusting acceleration.

Therefore, the market demands a system and method for compensating acceleration of electrical motorbikes such that the electrical motorbikes can compete with the fuel-based motorbike in terms of thrusting acceleration.

SUMMARY OF THE INVENTION

It is the object of the present invention to provide a system and method for compensating acceleration of electrical motorbike, where the instantaneous throttle variation rate is detected to provide high-speed response for the output torque and the electrical motorbike has high-efficiency acceleration during operation in short time.

Accordingly, the present invention provides a system for compensating acceleration of motorbike, the system comprising:

a throttle unit receiving an operation magnitude and configured to generate an original throttle signal accordingly;

a processor electrically connected to the throttle unit and comprising an acceleration compensation module, a throttle compensation module and a torque controller, wherein the acceleration compensation module is configured to receive the original throttle signal, calculate a throttle variation rate based on a change in the operation magnitude, and calculate a throttle compensation value based on the throttle variation rate; the throttle compensation module adds the throttle variation rate to the original throttle signal to obtain a new throttle signal, and the torque controller is configured to generate a torque command based on the new throttle signal; and an electro-mechanic assembly electrically connected to the processor and receiving the torque command from the processor, the electro-mechanic assembly runs corresponding to the torque command;

wherein the acceleration compensation module is configured to continually monitor the change in the operation magnitude of the throttle unit, calculate the throttle variation rate and compare the throttle variation rate with a correction threshold, the acceleration compensation module is configured to start acceleration compensation and calculate the throttle compensation value when the throttle variation rate is larger than or equal to the correction threshold.

Accordingly, the present invention provides a method for compensating acceleration of electrical motorbike, the method comprising steps of:

a) providing a throttle unit for receiving an operation magnitude and generating an original throttle signal accordingly;

b) providing an acceleration compensation module for receiving the original throttle signal and calculating a throttle variation rate based on a change in the operation magnitude;

c) comparing the throttle variation rate with a correction threshold;

d) the acceleration compensation module calculating a throttle compensation value based on the throttle variation rate when the throttle variation rate is larger than or equal to the correction threshold;

e) providing a throttle compensation module for adding the throttle compensation value to the original throttle signal to generate a new throttle signal;

f) providing a torque controller for generating a torque command based on the new throttle signal;

g) providing an electro-mechanic assembly for receiving the torque command from the processor and running corresponding to the torque command; and h) repeating the steps a) to g) until the motorbike is turned off.

In comparison with the related art, the present invention compensates the output torque with respect to the throttle variation rate such that the output torque can reach a peak value within short time to render the electrical motorbike to have thrusting acceleration competing with fuel-based motorbike using engine chip.

Besides, the correction coefficient is set based on various factors. Therefore, the electrical motorbike can have comfortable ride, safety and energy saving while the output torque thereof is compensated.

BRIEF DESCRIPTION OF DRAWINGS

The present invention can be more fully understood by reading the following detailed description of the embodiment, with reference made to the accompanying drawings as follows.

DETAILED DESCRIPTION OF THE INVENTION

Figure 1A:
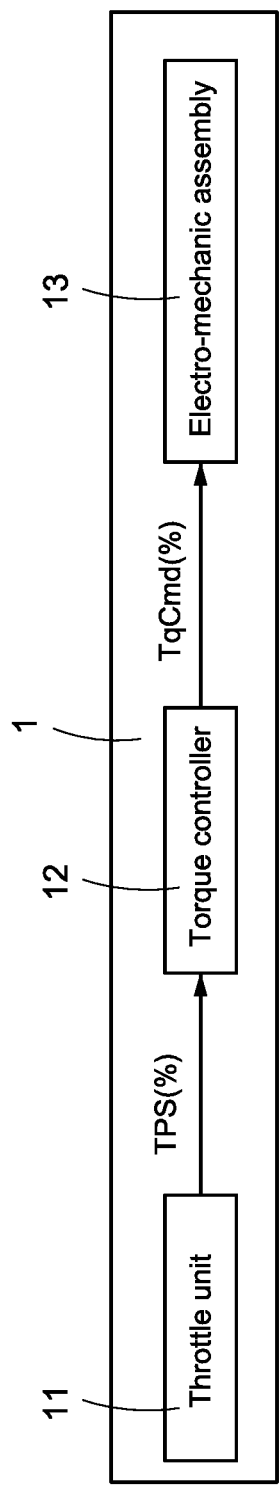
FIG. 1A shows the block diagram for the related art electrical motorbike.

Reference will now be made to the drawing figures to describe the present invention in detail. It will be understood that the drawing figures and exemplified embodiments of present invention are not limited to the details thereof.

The present invention provides a system for compensating acceleration of an electrical motorbike (hereinafter, the compensating system). The compensating system detects the throttle variation rate from rider's operation to the electrical motorbike and generates corresponding output torque based on the throttle variation rate for high-speed response and compensation. Therefore, the electrical motorbike has thrusting acceleration in the manner like the fuel-based engine with chip or the jet engine.

Figure 2:
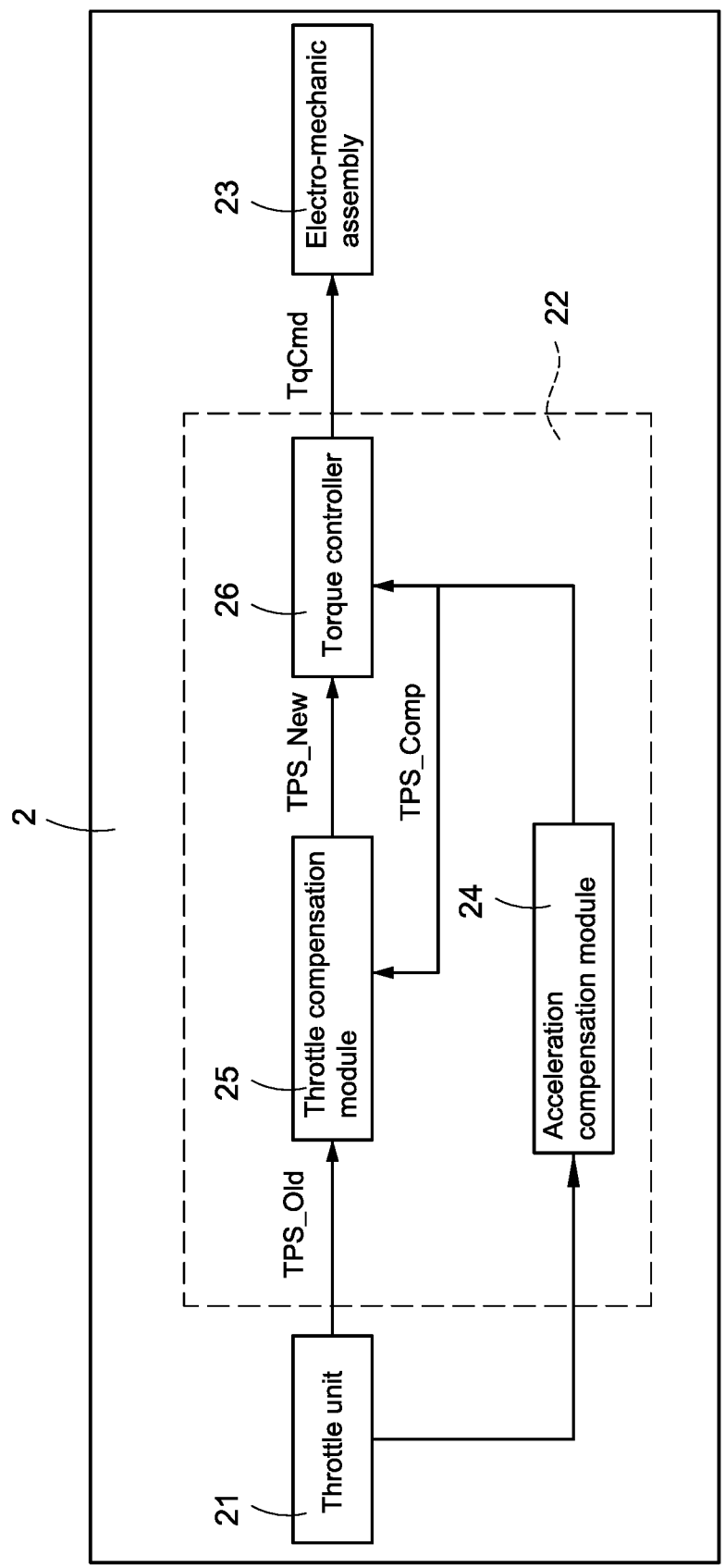
FIG. 2 shows the block diagram of the electrical motorbike according to a first embodiment of the present invention.

FIG. 2 shows the block diagram of the electrical motorbike according to a first embodiment of the present invention. The electrical motorbike 2 of the present invention mainly comprises a throttle unit 21, a processor 22 electrically connected to the throttle unit 21, and an electro-mechanic assembly 23 electrically connected to the processor 22. The electro-mechanic assembly 23 is an internal element to drive the electrical motorbike 2 to move and may include, for example but not limited to, a motor, a current loop control unit or a battery management unit and so on.

The throttle unit 21 receives an external operation or manipulation from the rider and then generates the original throttle signal TPS_Old accordingly. More particularly, the original throttle signal TPS_Old is corresponding to the operation magnitude (generally the rotation angle) of the throttle unit 21 operated by the rider; therefore, the variation of the throttle signal is corresponding to the variation of the operation magnitude operated and generated by the driver. Namely, the smaller of the operation magnitude operated by the rider (i.e., the magnitude change of the throttle unit 21 is smaller), the original throttle signal TPS_Old is smaller. On the contrary, the larger of the operation magnitude operated by the rider (i.e., the magnitude change of the throttle unit 21 is larger), the original throttle signal TPS_Old is larger. The processor 22 receives the original throttle signal TPS_Old and the variation of the throttle signal (the variation of the operation magnitude of the throttle unit 21), and then performs analysis, calculation and compensation for the original throttle signal TPS_Old. The processor 22 then generates the corresponding torque command TqCmd based on the compensated throttle signal, where the content of the torque command TqCmd includes records for the output torque corresponding to the compensated throttle signal.

As shown in FIG. 2, the processor 22 comprises an acceleration compensation module 24, a throttle compensation module 25 and a torque controller 26. According to one embodiment, the above acceleration compensation module 24, throttle compensation module 25 and torque controller 26 can be implemented by hardware within the processor 22. According to another embodiment, the above acceleration compensation module 24, throttle compensation module 25 and torque controller 26 can be implemented by various firmware functions of the processor 22 and virtually divided into different software-based modules 24, 25, and 26.

According to one embodiment, the processor 22 receives the original throttle signal TPS_Old from the acceleration compensation module 24 and then calculates the throttle variation rate ΔTPS based on the original throttle signal TPS_Old. More particularly, the acceleration compensation module 24 receives two successive original throttle signals TPS_Old during a short time span (for example, within 0.1 seconds) from the throttle unit 21 and then calculates the throttle variation rate ΔTPS during the time span based on the two successive original throttle signals TPS_Old. The acceleration compensation module 24 then activates an acceleration compensation mechanism based on the throttle variation rate ΔTPS and then further calculates the throttle compensation value TPS_Comp. When the rider maintains operating the throttle unit 21 to a fixed operation position, the throttle variation rate ΔTPS is zero. The calculation corresponding to the throttle compensation value TPS_Comp will be detailed later.

In the present invention, the throttle variation rate ΔTPS is the instantaneous change of the original throttle signal during a short time span (such as 0.1 second). When the throttle variation rate ΔTPS is larger than a correction threshold set or designed by the electrical motorbike 2, the throttle compensation value TPS_Comp is positively proportional to the throttle variation rate ΔTPS. Namely, the larger the instantaneous rotational magnitude of throttle is operated by the driver (i.e., the larger instantaneous change in the operation magnitude of the throttle unit 21), the compensation for the final output torque command (i.e., the output torque) is larger. Therefore, the present invention provides a high-speed compensation mechanism for the output torque.

Besides, the throttle compensation module 25 receives the original throttle signal TPS_Old from the throttle unit 21, and also receives the throttle compensation value TPS_Comp from the acceleration compensation module 24. The throttle compensation module 25 then calculates a new throttle signal TPS_New based on the original throttle signal TPS_Old and the throttle compensation value TPS_Comp. According to one embodiment, the throttle compensation module 25 adds the original throttle signal TPS_Old with the throttle compensation value TPS_Comp to obtain the new throttle signal TPS_New (namely, the new throttle signal TPS_New is the sum up value of the original throttle signal TPS_Old and the throttle compensation value TPS_Comp). In this embodiment, the new throttle signal TPS_New is larger than or equal to the original throttle signal TPS_Old.

The throttle compensation module 25 may continually receive the original throttle signal TPS_Old and the throttle compensation value TPS_Comp for the calculation of the new throttle signal TPS_New. If the acceleration compensation module 24 does not output the throttle compensation value TPS_Comp at a certain time point or the throttle compensation value TPS_Comp is calculated to be zero, the new throttle signal TPS_New output by the throttle compensation module 25 at this time point is equal to the original throttle signal TPS_Old output by the throttle unit 21.

The torque controller 26 receives the new throttle signal TPS_New output by the throttle compensation module 25 and then calculates the corresponding torque command TqCmd based on the new throttle signal TPS_New. The calculated torque command TqCmd has a record of output torque (i.e., the compensated output torque) based on the new throttle signal TPS_New (i.e., the compensated throttle signal). The torque controller 26 then outputs the torque command TqCmd to the electro-mechanic assembly 23, and thus the electro-mechanic assembly 23 operates and runs according to the received content of the torque command TqCmd.

Figure 1B:
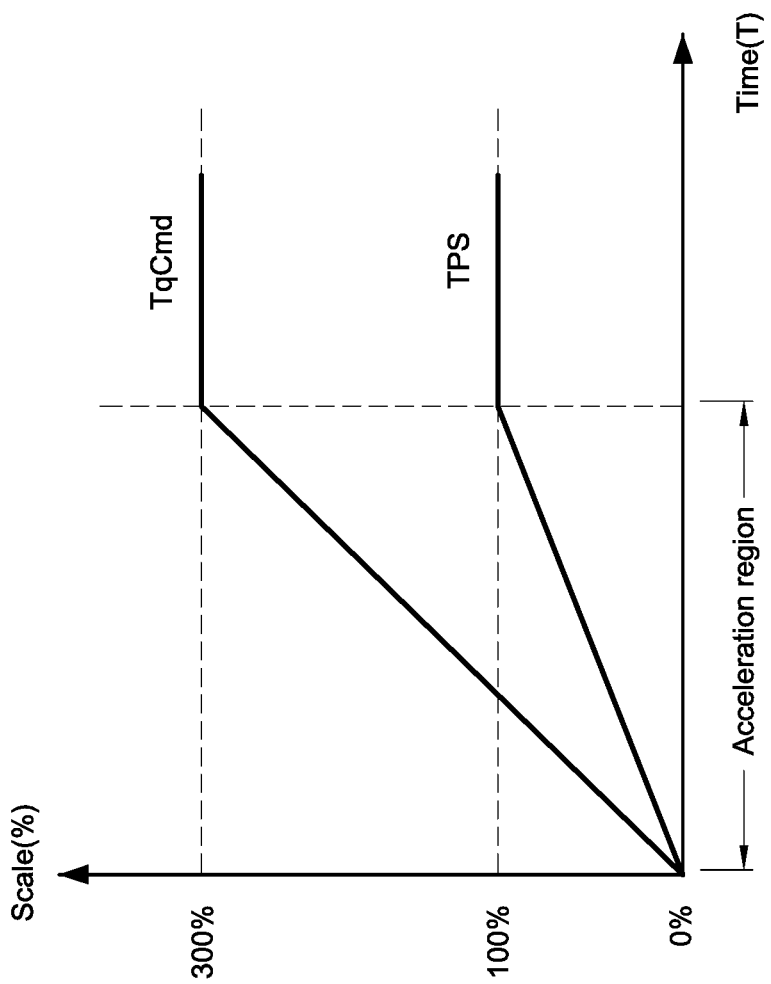
FIG. 1B shows the acceleration curve for the related art electrical motorbike.

Notably, in this embodiment, the torque controller 26 may calculate the output torque to be proportional to the received new throttle signal TPS_New, which is similar to the manner in related art electrical motorbike 1 (such as the curve shown in FIG. 1B). However, the torque controller 26 calculates the output torque based on the compensated new throttle signal TPS_N. In other word, the torque command TqCmd output by the torque controller 26 (which is based on the new throttle signal TPS_New) is larger than that based on the original throttle signal TPS_Old. The rider can sense strong feeling of thrusting acceleration at the time point.

Figure 3A:
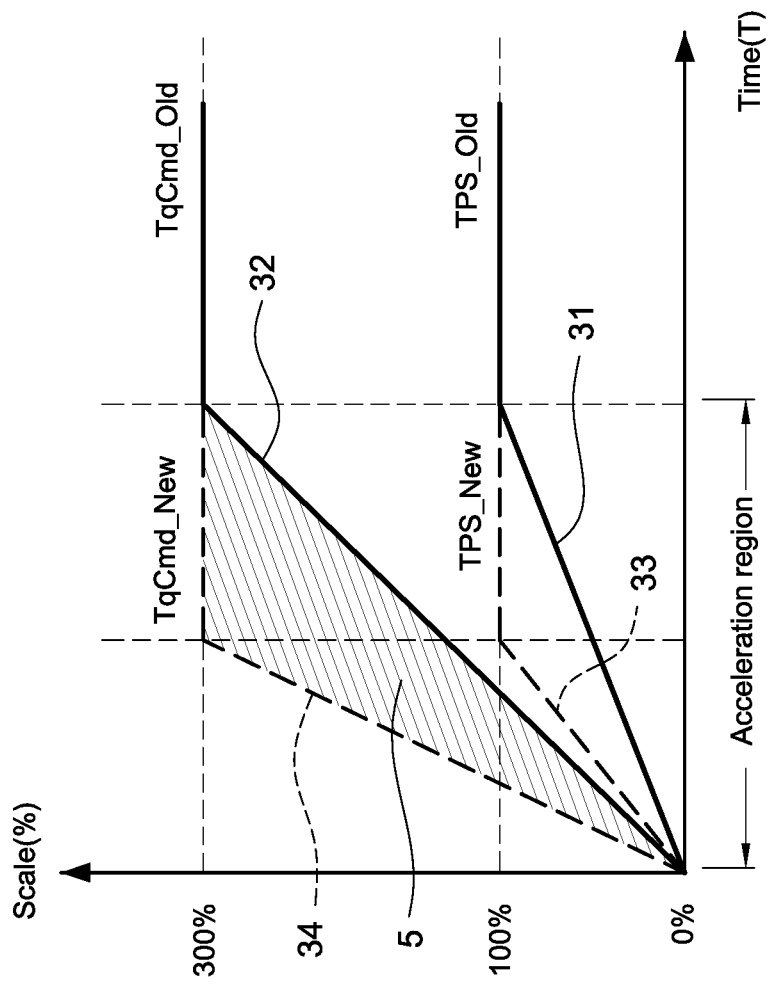
FIG. 3A shows the acceleration curve according to the first embodiment.

FIG. 3A shows the acceleration curve according to the first embodiment. As shown in FIGS. 2 and 3A, as the solid line shown in bottom part of FIG. 3A, in the related art electrical motorbike 1, where the throttle unit 21 outputs the original throttle signal 31 after receiving rider operation, and then the processor 21 calculates the original output torque 32 based on the original throttle signal 31 with proportion as the solid line shown in top part of FIG. 3A,. The power curve of the related art electrical motorbike 1 is linear, and the rider cannot sense strong feeling of thrusting acceleration.

In the present invention, on contrary, where the throttle unit 21 outputs the original throttle signal 31 after receiving rider operation, and then the processor 22 firstly compensates the original throttle signal 31 to obtain the new throttle signal 33 (mainly performing the compensation based on the throttle variation rate) as the dashed line shown in bottom part of FIG. 3A, and then calculates the new output torque 34 based on the new throttle signal 33 with proportion as the dashed line shown in top part of FIG. 3A,. By the compensation of the processor 22, the new throttle signal 33 and the new output torque 34 may reach the rated upper bound of the electrical motorbike 2 earlier. Therefore, the rider may sense strong sense of thrusting acceleration during the rapid acceleration operation (namely, in the acceleration region shown in FIG. 3A).

In the embodiment shown in FIG. 3A, that the new throttle signal 33 will reach the rated upper bound of the electrical motorbike 2 earlier than the original throttle signal 31 may be achieved. The present embodiment is exemplified that the rated upper bound of the throttle unit 21 is 100%. The new output torque 34 will also reach the rated upper bound of the electrical motorbike 2 earlier (faster) than the original output torque 32 may achieve. The present embodiment is exemplified that the rated upper bound of the electro-mechanic assembly 23 may be up to 300%. In other word, the new output torque 34 may operates the electro-mechanic assembly 23 in the range of 100% to 300% of the rated upper bound. After the new output torque 34 reaches the rated upper bound, the new torque command TqCmd_New keeps on the same level, no matter whether the original throttle signal 31 or the new throttle signal 33 still increases.

After the rider stops operation of acceleration (namely, the throttle unit 21 of the electrical motorbike 2 is operated to exit the acceleration region), the process 22 no longer compensates the original throttle signal 31 because the throttle variation rate is zero. Namely, the throttle compensation value is zero and the new throttle signal 33 is equal to the original throttle signal 31 (also, the new output torque 34 is equal to the original output torque 32).

As shown in FIG. 3A, the time difference between the original output torque 32 and the new output torque 34 is the compensation region 5 provided by the compensation scheme of the present invention. Therefore, by the technique of the present invention, the rider can sense strong feeling of thrusting acceleration, which is similar to that provided by fuel-based motorbike with fuel-based engine with chip or jet engine, during the early stage of acceleration.

Generally, the rated upper bound of output torque is not the performance limit of the electrical motorbike 2; instead it is the purposely set upper bound to protect the driver, the battery or other elements of the electrical motorbike 2 from overheating. In certain specific condition (such as overdrive or boost mode), the electrical motorbike 2 may be allowed to output torque exceeding the above-mentioned rated upper bound, for example but not limited.

Figure 3B:
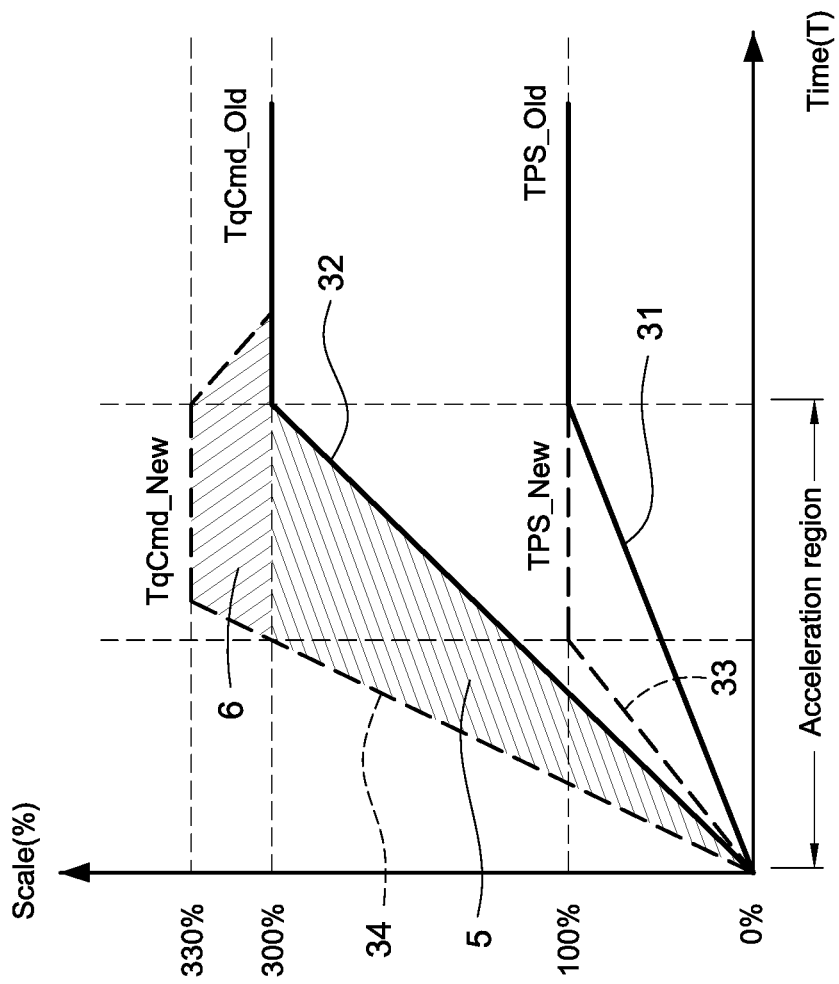
FIG. 3B shows the acceleration curve according to the second embodiment.

FIG. 3B shows the acceleration curve according to the second embodiment. As shown in FIGS. 2 and 3B, if the new output torque 34 as the dashed line shown in top part of FIG.

3B which calculated by the processor 22 already reaches the rated upper bound, and the original throttle signal 31 as the solid line shown in bottom part of FIG. 3B which still increases (namely, the throttle variation rate is still larger than the correction threshold), the processor 22 continually compensates the new output torque 34 such that the new output torque 34 may reach the overdrive upper bound (in the embodiment the overdrive upper bound is for example 330%). In other word, the new output torque 34 enables the electro-mechanic assembly 23 to output torque in the range of overdrive upper bound, namely 330%. When the original throttle signal 31 stops increasing (namely, the throttle variation rate is zero or smaller than the correction threshold), the processor 22 controls the new output torque 34 to be below a corresponding ratio (for example, when the original throttle signal 31 remains in 100%, the new output torque 34 returns to the rated upper bound 300%). Namely, the new output torque 34 enables the electro-mechanic assembly 23 to output torque in the range of rated upper bound 300%. As shown in FIG. 3B, the processor 22 compensates the new output torque 34 such that the electro-mechanic assembly 23 outputs torque in the range of rated upper bound 100-300%. The rider may sense strong feeling of thrusting acceleration during this manner of rapid acceleration operation.

In the embodiment shown in FIG. 3B, a time difference between the original output torque 32 as the solid line shown in top part of FIG. 3B and the new output torque 34 comprises the above-mentioned compensation region 5 and an overdriving region 6 calculated within a short overdriving time period. In this embodiment, the acceleration operation of the rider (the acceleration region shown in FIG. 3B) only remains very short time period (for example 0.1~0.2 seconds). Even though the processor 22 performs overdriving operation to output the new output torque 34 with overdrive upper bound larger than the rated upper bound (overdriving region 6), the elements of the electrical motorbike 2 (such as driver, battery and so on) will not be damaged by the very short time period of overdrive acceleration. However, by the above overdrive operation, the rider can further enjoy enhanced feeling of thrusting acceleration.

Figure 4:
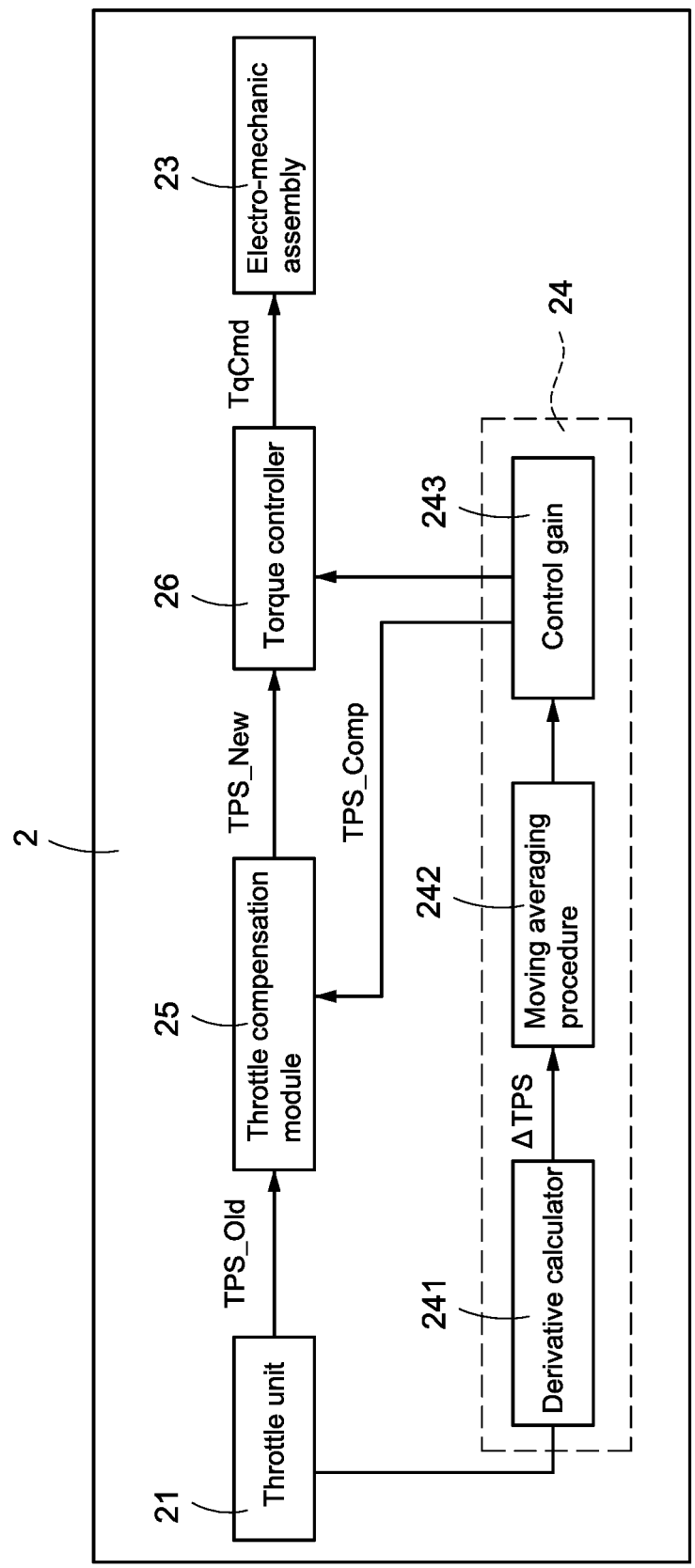
FIG. 4 shows the block diagram of the electrical motorbike according to a second embodiment of the present invention.

FIG. 4 shows the block diagram of the electrical motorbike according to the second embodiment of the present invention. In this embodiment, the acceleration compensation module 24 can be virtually divided into various functional blocks according to the functions thereof. In the embodiment shown in FIG. 4, the acceleration compensation module 24 at least comprises a derivative calculator 241, a moving averaging procedure unit 242 and a control gain 243.

More particularly, when the acceleration compensation module 24 receives the original throttle signal TPS_Old from the throttle unit 21, the derivative calculator 241 of the acceleration compensation module 24 performs derivative operation to the original throttle signal TPS_Old to calculate the throttle variation rate ΔTPS. Therefore, the corresponding throttle compensation value TPS_Comp can be calculated based on the throttle variation rate ΔTPS.

According to one embodiment, the acceleration compensation module 24 further calculates the average (value) of the throttle variation rate ΔTPS by the moving averaging procedure unit 242 after calculating the throttle variation rate ΔTPS, and then calculates the corresponding throttle compensation value TPS_Comp based on the average of the throttle variation rate ΔTPS. In this embodiment, the acceleration compensation module 24 mainly establishes a trend prediction model for the original throttle signal TPS_Old based on the moving averaging procedure calculation, and then generates the throttle compensation value TPS_Comp based on the trend prediction model, thus provides earlier response for the throttle signal. The moving averaging procedure is well known a procedure for calculating average and thus the detailed description is omitted here for brevity.

According to another embodiment, the acceleration compensation module 24 further multiplies the average (value) of the throttle variation rate ΔTPS with a preset value of the control gain 243 after obtaining the average of the throttle variation rate ΔTPS in order to calculate the throttle compensation value TPS_Comp. According to one embodiment, the preset value of the control gain 243 is, for example but not limited to, set to be 1.0 according to practical need and may be adjustable according to user's need. According to another embodiment, the preset value of the control gain 243 is, for example but not limited to, set to be 0.6 or 0.8 or other numerical ranges. The above control gain 243 is used to set the ratio between input signal and output signal.

Please note that, in the present invention, the original throttle signal TPS_Old is augmented with the throttle compensation value TPS_Comp to increase the final output toque value and so as to achieve fast response, which is different with the conventional boost mode using T-N setting curve to directly increase final output toque value.

Besides, the present invention firstly determines whether the throttle variation rate ΔTPS satisfies a correction condition, and calculates the throttle compensation value TPS_Comp after ensuring that the throttle variation rate ΔTPS satisfies the correction condition. Therefore, the acceleration and the manipulation of the electrical motorbike 2 can be enhanced without sacrificing the safety, the stability, efficiency and economy of the electrical motorbike 2.

As mentioned above, the throttle compensation module 25 receives the original throttle signal TPS_Old from the throttle unit 21 and receives the throttle compensation value TPS_Comp from the acceleration compensation module 24 to calculate and output the new throttle signal TPS_New. Afterward, the torque controller 26 calculates and outputs the corresponding torque command TqCmd based on the new throttle signal TPS_New such that the electro-mechanic assembly 23 has corresponding operation based on the calculated torque command TqCmd. The content in the torque command TqCmd output by the torque controller 26 has a record relating to the output torque corresponding to the new throttle signal TPS_New.

Figure 5:
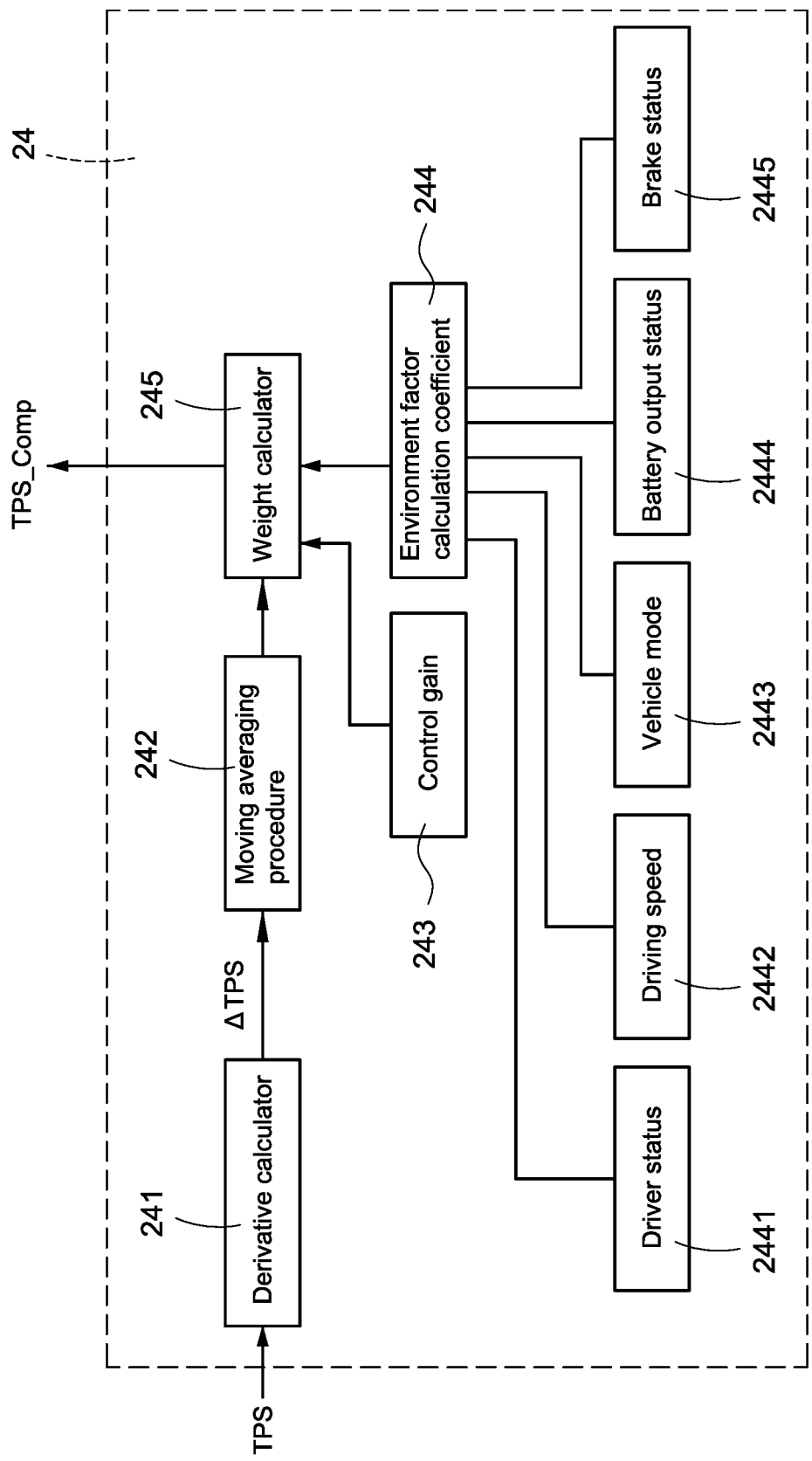
FIG. 5 is the block diagram of the acceleration compensation module according to the first embodiment of the present invention.

FIG. 5 is the block diagram of the acceleration compensation module 24 according to the first embodiment of the present invention. In this embodiment, the acceleration compensation module 24 is configured to virtually divide into functional blocks including at least one environment factor calculation coefficient 244 and at least one weight calculator 245.

More particularly, in this embodiment, the acceleration compensation module 24 generates a final correction coefficient by using the weight calculator 245 and based on the control gain 243 and at least one environment factor calculation coefficient 244. More specifically, after finishing the moving averaging procedure unit 242, then the weight calculator 245 continually multiplies the average of a plurality of throttle variation rates ΔTPS with the above correction coefficients to generate the throttle compensation value TPS_Comp.

In the present invention, the weight calculator 245 firstly analyzes the current condition of the throttle variation rate ΔTPS (such as whether its value is larger than or smaller than the correction threshold, or whether its value is larger than or smaller than a cancelling threshold, which will be detailed later). The weight calculator 245 then calculates the throttle compensation value TPS_Comp based on the analysis and factors such as the control gain 243 and the environment factor calculation coefficients 244 as mentioned. In one embodiment, the weight calculator 245 calculates the product of the average of the throttle variation rate ΔTPS, the control gain 243 and at least one environment factor calculation coefficient 244, and then adapts the product as the throttle compensation value TPS_Comp when the throttle variation rate ΔTPS is larger than or equal to the correction threshold. However, the above example is not limitation of the present invention.

In the embodiment shown in FIG. 5, the processor 22 is operatively connected with a battery management system (BMS) within the electrical motorbike 2 and treats the driver status 2441, the driving speed 2442, the vehicle mode 2443, the battery output status 2444 and brake status 2445 and so on as consisting elements of a set of the environmental factors, and then determines the above-mentioned environment factor calculation coefficient 244 based on the environmental factors.

In one embodiment, the environmental factor about driving speed 2442 includes at least a low-medium speed status and a high-speed status. In view of safety and manipulation, the acceleration compensation module 24 has larger calculation coefficient (such as 1.2 times, which may be seemed a kind of weighting coefficient) when the environmental factor of the electrical motorbike 2 is corresponding to the low-medium speed status; while the acceleration compensation module 24 has smaller calculation coefficient (such as 0.5 times) when the environmental factor of the electrical motorbike 2 is corresponding to the high speed status. Therefore, the electrical motorbike 2 has higher output power and strong feeling of thrusting acceleration when starting up, and also has a safety operation when its speed is higher.

In another embodiment, the environmental factor about vehicle mode 2443 includes at least an economic mode and a power mode. To provide the rider with different power and energy consumptions for different operation modes, the acceleration compensation module 24 may have larger calculation coefficient (such as 1.0 times) when the vehicle mode of the electrical motorbike 2 is in the power mode; while acceleration compensation module 24 may have smaller calculation coefficient (such as 0.6 times) when the vehicle mode of the electrical motorbike 2 is in the economic mode. Therefore, each of the vehicle modes of the electrical motorbike 2 may fulfill its own target, namely, whatever rider wants fast acceleration or energy-saving.

In another embodiment, the environmental factor about the battery output status 2444 at least includes a remaining battery capacity, a battery temperature and a battery voltage. The remaining battery capacity, the battery temperature and the battery voltage are important factors of the electrical motorbike 2 in view of endurance and operation safety of the electrical motorbike 2. The acceleration compensation module 24 may intervene when the environmental factor about the battery output status has any one of the following conditions: (1) the remaining battery capacity is smaller than a capacity threshold (such as 30% of total capacity), (2) the temperature of the battery is higher than an over-temperature threshold (such as more than 300☐) and (3) the battery voltage is lower than a low-voltage threshold (such as lower than 40V). The calculation coefficient corresponding to the above-mentioned battery output status is zero such that the final correction coefficient is zero after multiplication (namely, the throttle compensation is cancelled). By above scheme, the final throttle compensation value TPS_Comp is zero to protect the battery and to save energy.

Figure 6:
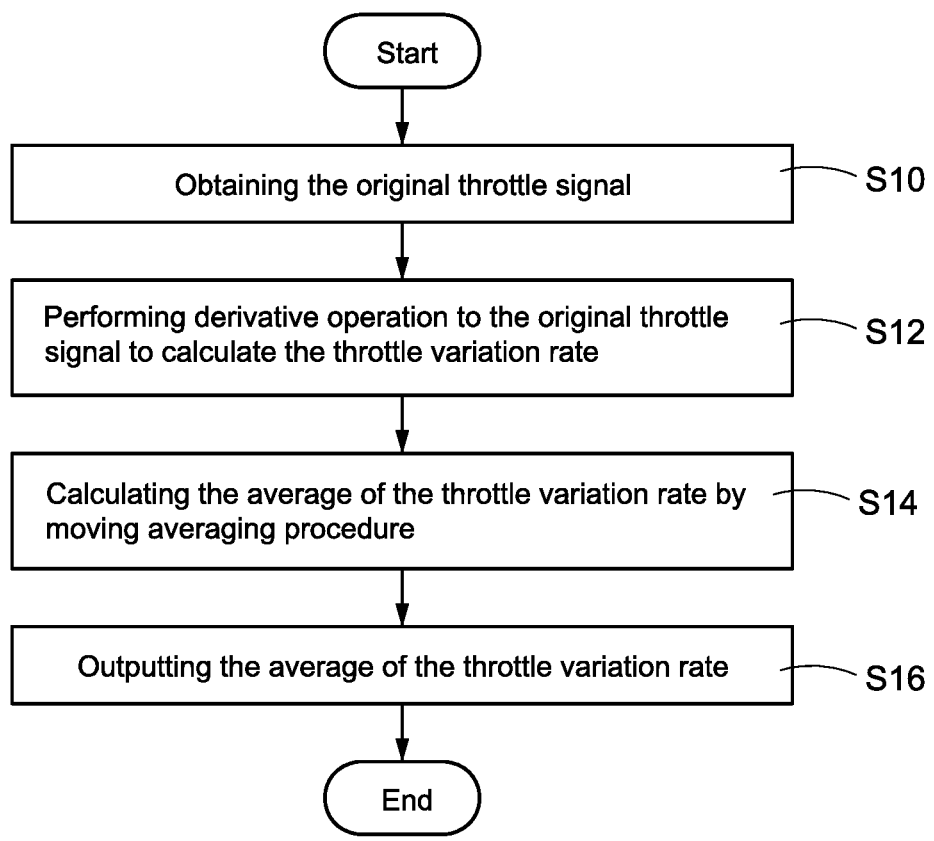
FIG. 6 shows the flowchart for calculating the throttle variation rate according to the first embodiment of the present invention.

FIG. 6 shows the flowchart for calculating the throttle variation rate ΔTPS according to the first embodiment of the present invention.

In the present invention, the processor 22 continually obtains the original throttle signal TPS_Old from the throttle unit 21 during a short time duration (such as 0.1 to 0.2 seconds) of acceleration controlled by the rider (step S10). The processor 22 continually performs derivative operation to the original throttle signal TPS_Old to calculate the throttle variation rate ΔTPS (step S12), and then continually calculates the average of the throttle variation rate ΔTPS by the moving averaging procedure unit 242 (step S14), and then outputs the average of the throttle variation rate ΔTPS (step S16) in order to calculate the throttle compensation value TPS_Comp.

Figure 7:
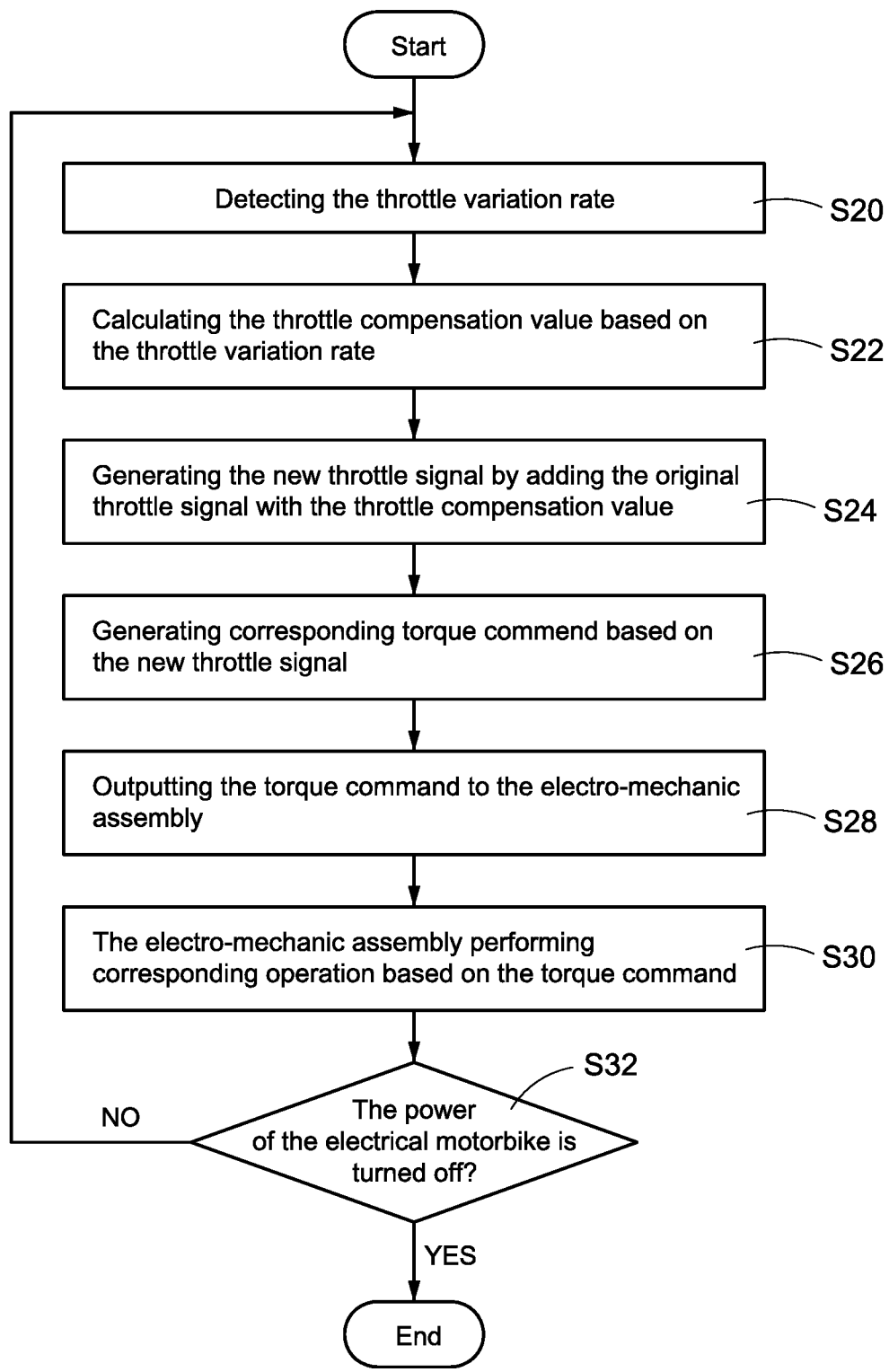
FIG. 7 shows the flowchart for compensating acceleration according to the first embodiment of the present invention.

FIG. 7 shows the flowchart for compensating acceleration according to the first embodiment of the present invention, where FIG. 7 discloses each step of the method for compensating acceleration used in the system for compensating acceleration according to the present invention.

The method for compensating acceleration according to the present invention can be applied to the electrical motorbike 2 shown in any of FIGS. 2 to 5 to compensate the torque for accelerating the electrical motorbike 2.

As shown in FIG. 7, at first, the processor 22 of the electrical motorbike 2 detects the throttle variation rate ΔTPS (step S20). More particularly, the processor 22 continually monitors the throttle unit 21 and then calculates the throttle variation rate ΔTPS based on the steps shown in FIG. 6. The average of the throttle variation rate ΔTPS is calculated if the step S14 is performed.

Afterward, the processor 22 adapts the acceleration compensation module 24 to calculate the throttle compensation value TPS_Comp based on the throttle variation rate ΔTPS (step S22) and adapts the throttle compensation calculation module 25 to add the original throttle signal TPS_Old with the throttle compensation value TPS_Comp, thus generate the new throttle signal TPS_New (step S24).

Afterward, the torque controller 26 of the processor 22 receives the new throttle signal TPS_New and then generates corresponding torque commend TqCmd based on the new throttle signal TPS_New (step S26). Finally, the processor 22 outputs the torque command TqCmd to the electro-mechanic assembly 23 of the electrical motorbike 2 (step S28). Therefore, the electro-mechanic assembly 23 may perform corresponding operation based on the content of the torque command (step S30).

After the step S30, the processor 22 determines whether the power of the electrical motorbike 2 is tuned off (step S32) and then continually performs steps from S20 to S30 before the power of the electrical motorbike 2 is turned off. Therefore, the processor 22 continually monitors the original throttle signal TPS_Old and the variation of magnitude for the throttle unit, and then continually generates the throttle compensation value TPS_Comp, the new throttle signal TPS_New, and then continually determines whether the output torque is need to be compensated, thus provides satisfactory riding sense.

It should be noted that the present invention generates the throttle compensation value TPS_Comp to compensate the output torque only when the throttle variation rate ΔTPS satisfies certain condition (for example when the throttle variation rate ΔTPS is larger than or equal to a preset correction threshold). Therefore, the processor 22 will not calculate and generate the throttle compensation value TPS_Comp (i.e., the output torque is not compensated) when the rider operates the electrical motorbike 2 to have a slow acceleration (namely, the instantaneous throttle variation rate $\Delta$TPS is smaller than the preset correction threshold). Therefore, the rider can be provided with safety and operation stability when riding the electrical motorbike 2.

Figure 8:
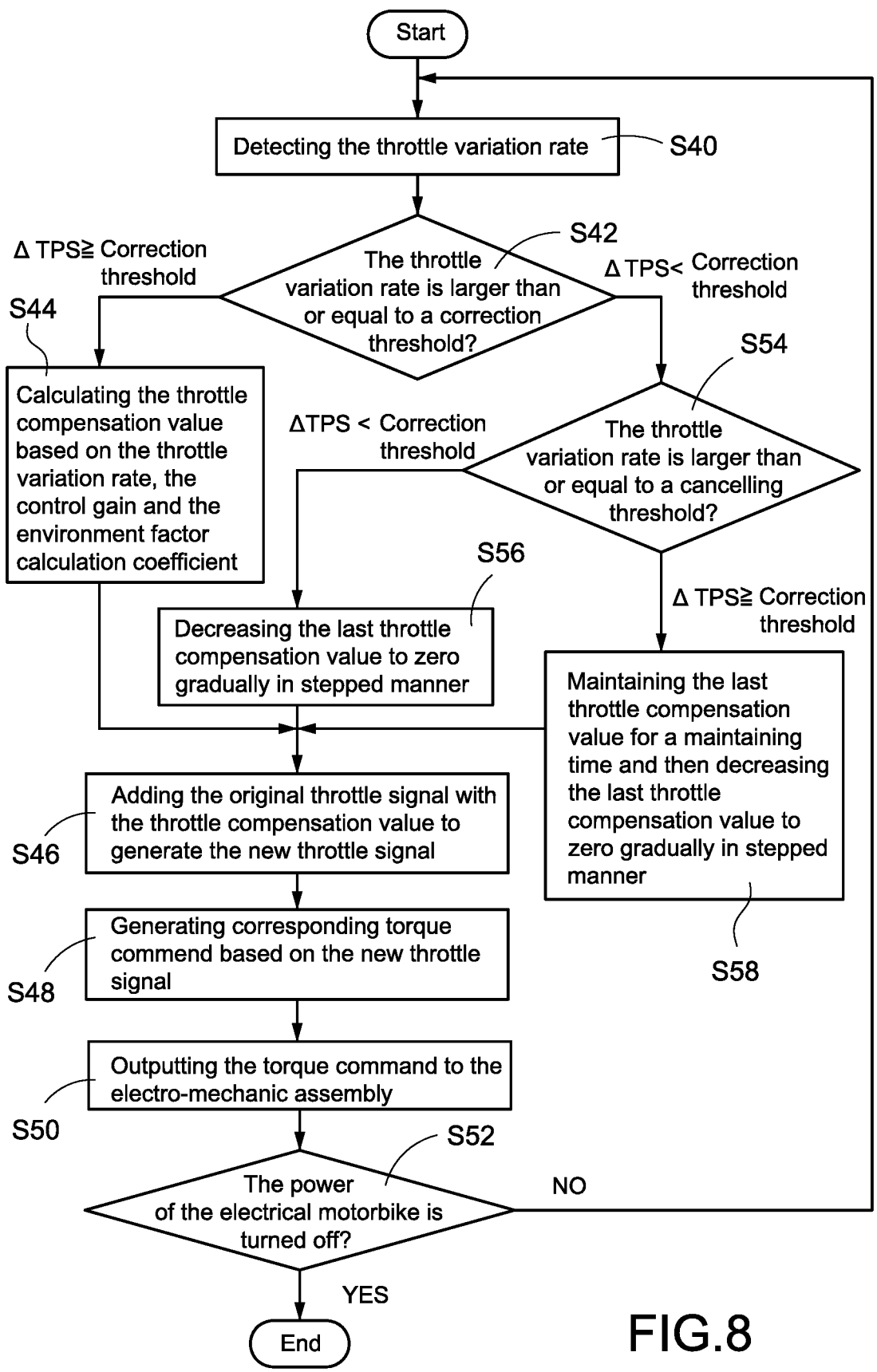
FIG. 8 shows the flowchart for compensating acceleration according to the second embodiment of the present invention.

FIG. 8 shows the flowchart for compensating acceleration according to the second embodiment of the present invention. In this embodiment, the processor 22 may continually monitor the throttle variation rate $\Delta$TPS of the electrical motorbike 2 according the steps shown in FIG. 6 (step S40). Afterward, the acceleration compensation module 24 adapts the weight calculator 245 to compare the throttle variation rate $\Delta$TPS (or the average of the throttle variation rate $\Delta$TPS) with the preset correction threshold to determine whether the throttle variation rate $\Delta$TPS is larger than or equal to the correction threshold (step S42). In one embodiment, the correction threshold may be, but not limited to, 5% of rated upper bound of the original throttle signal TPS_Old.

If the current throttle variation rate $\Delta$TPS is determined to be larger than or equal to the correction threshold, the weight calculator 245 thus calculates the throttle compensation value TPS_Comp based on the throttle variation rate $\Delta$TPS (or the average of the throttle variation rate $\Delta$TPS), the control gain 243 and at least one environment factor calculation coefficient 244 (step S44). In one embodiment, the weight calculator 245 multiplies the throttle variation rate $\Delta$TPS with the control gain 243 and at least one environment factor calculation coefficient 244 to obtain the throttle compensation value TPS_Comp.

After step S44, the throttle compensation module 25 of the processor 22 adds the original throttle signal TPS_Old with the throttle compensation value TPS_Comp to generate the new throttle signal TPS_New (step S46). The torque controller 26 of the processor 22 calculates the corresponding torque command based on the new throttle signal TPS_New (step S48), and then outputs the torque command to the electro-mechanic assembly 23 (step S50) such that the electro-mechanic assembly 23 performs or runs corresponding operation. In this embodiment, if the new throttle signal TPS_New is larger than the original throttle signal TPS_Old, the output torque in the record of the torque command is compensated. On the contrary, if the new throttle signal TPS_New is equal to the original throttle signal TPS_Old, the output torque in the record of the torque command TqCmd is equal to the output torque directly computed from the original throttle signal TPS_Old.

In step S42, if the current throttle variation rate $\Delta$TPS is smaller than the correction threshold, the weight calculator 245 further compares the throttle variation rate $\Delta$TPS (or the average of the throttle variation rate $\Delta$TPS) with a preset cancelling threshold to determine whether the throttle variation rate $\Delta$TPS is larger than or equal to the preset cancelling threshold (step S54). In one embodiment, the cancelling threshold is smaller than the correction threshold and is, for example but not limited to, 0% of the rated upper bound of the throttle signal.

In step S54, if the current throttle variation rate $\Delta$TPS is smaller than the cancelling threshold (for example, the throttle variation rate $\Delta$TPS is smaller than zero, it means the rider actively releases the throttle control), this means that the processor 22 needs not to compensate the output torque. However, if the previously-provided compensation is directly and abruptly cancelled when the throttle variation rate $\Delta$TPS is smaller than the cancelling threshold, the rider may have stalling feeling due to the abrupt deceleration. To prevent the rider from having such stalling sense, the weight calculator 245 may gradually reduce (such as in a downward stepped manner) the last throttle compensation value TPS_Comp to zero (step S56) so as to mildly or gradually reduce the speed of the electrical motorbike 2.

In above mentioned step S56, the weight calculator 245 mildly or gradually reduces the throttle compensation value TPS_Comp to zero during a time period. In this time period, the throttle compensation module 25 continually calculates the new throttle signal TPS_New based on the original throttle signal TPS_Old and the gradually decreased throttle compensation value TPS_Comp (step S46). The torque controller 26 continually calculates the corresponding torque command TqCmd based on the new throttle signal TPS_New (step S48) and then outputs the torque command TqCmd to the electro-mechanic assembly 23 (step S50).

In the step S54, if the current throttle variation rate $\Delta$TPS is larger than or equal to the cancelling threshold (but still smaller than the correction threshold), it means that the rider stops to slow the acceleration for the electrical motorbike 2. In this embodiment, the weight calculator 245 stops updating the throttle compensation value TPS_Comp and keeps adapting the last throttle compensation value TPS_Comp for a maintaining time period (such as 0.5 seconds). After the maintaining time period (holding time), the weight calculator 245 may gradually reduce (such as in a downward stepped manner) the last throttle compensation value TPS_Comp to zero (step S58). During this time period, the throttle compensation module 25 continually calculates the new throttle signal based on the original throttle signal TPS_Old and the maintained (or the gradually decreased) throttle compensation value TPS_Comp (step S48), and then outputs the output torque to the electro-mechanic assembly 23 (step S50).

In this embodiment, the processor 22 continually monitors whether the power of the electrical motorbike 2 is turned off (step S52) and continually executes steps from S40 to S58 before the power of the electrical motorbike 2 is turned off. Therefore, the processor 22 can determine whether the output torque needs the corresponding compensation in real time with respect to the acceleration operation of the rider, thus provides better acceleration feeling for the rider.

Figure 9:
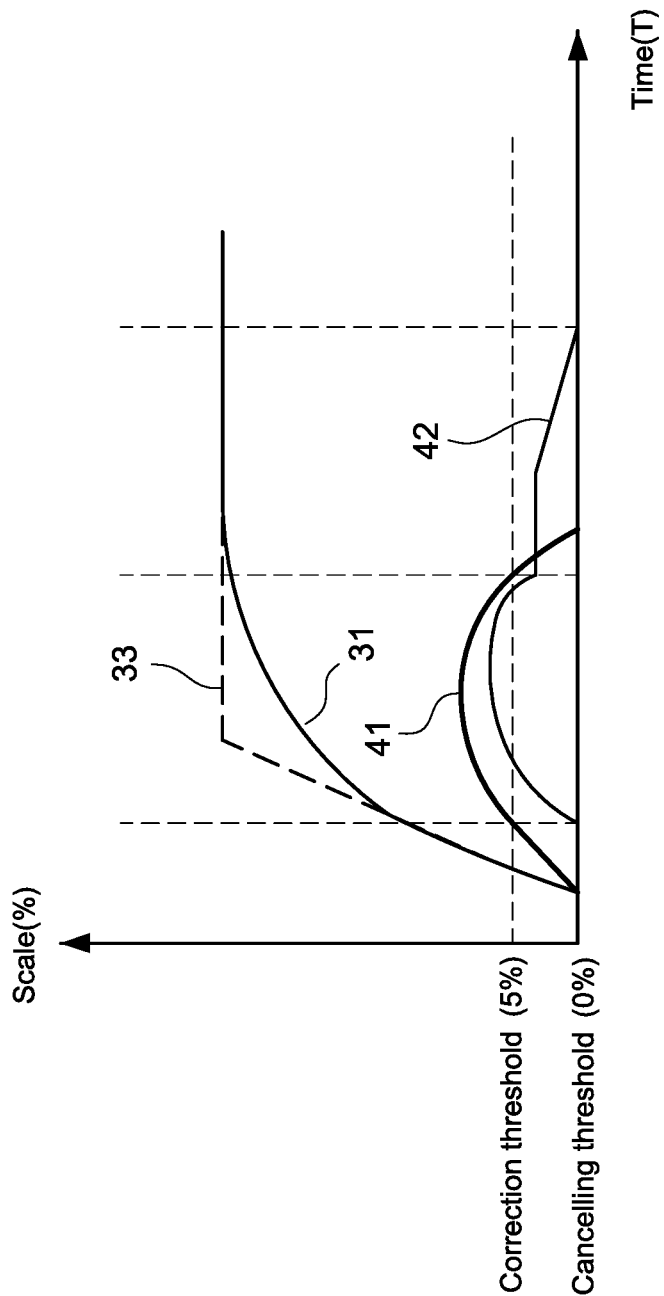
FIG. 9 is the waveform showing the signal change according to the first embodiment.

FIG. 9 is the waveform showing the signal change according to the first embodiment.

FIG. 9 shows the change of the original throttle signal 31 from 0% to 100%, namely, the electrical motorbike 2 accelerated from the rest state to the rated upper bound of the throttle signal. In the embodiment shown in FIG. 9, the correction threshold is 5% of the rated upper bound for the throttle signal, and the cancelling threshold is 0% of the rated upper bound for the throttle signal. But above example is not limitation of the present invention.

As shown in FIG. 9, when the throttle variation rate 41 is larger than or equal to the correction threshold, the weight calculator 245 starts to calculate the throttle compensation value 42 and adds the throttle compensation value 42 to the original throttle signal 31 to obtain the new throttle signal 33.

Figure 10:
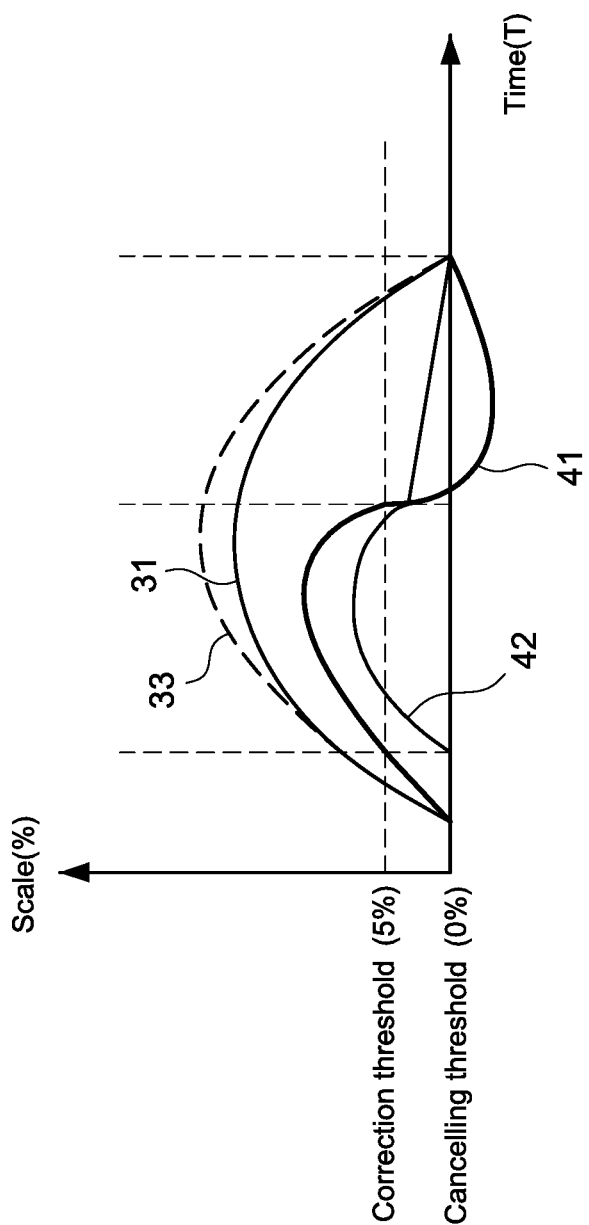
FIG. 10 is the waveform showing the signal change according to the second embodiment.

FIG. 10 is the waveform showing the signal change according to the second embodiment.

FIG. 10 shows the change of the original throttle signal 31 from 0% to 100%, and then changed from 100% to 0%, namely, the electrical motorbike 2 accelerated from the rest state to the rated upper bound of the throttle signal, and then decelerated back to the rest state again. In the embodiment shown in FIG. 10, the correction threshold is 5% of the rated upper bound for the throttle signal, and the cancelling threshold is 0% of the rated upper bound for the throttle signal. But above example is not limitation of the present invention.

As shown in FIG. 10, when the throttle variation rate 41 is larger than or equal to the correction threshold, the weight calculator 245 starts to calculate the throttle compensation value 42, and then adds the throttle compensation value 42 to the original throttle signal 31 to obtain the new throttle signal 33. When the throttle variation rate 41 is smaller to the cancelling threshold, the weight calculator 245 starts to gradually decrease the last calculated throttle compensation value 42 (such as in a downward stepped manner). Therefore, the weight calculator 245 gradually approaches the new throttle signal 33 which is calculated by the throttle compensation module 25 to the original throttle signal 31, and finally ends or stops the compensation.

Figure 11:
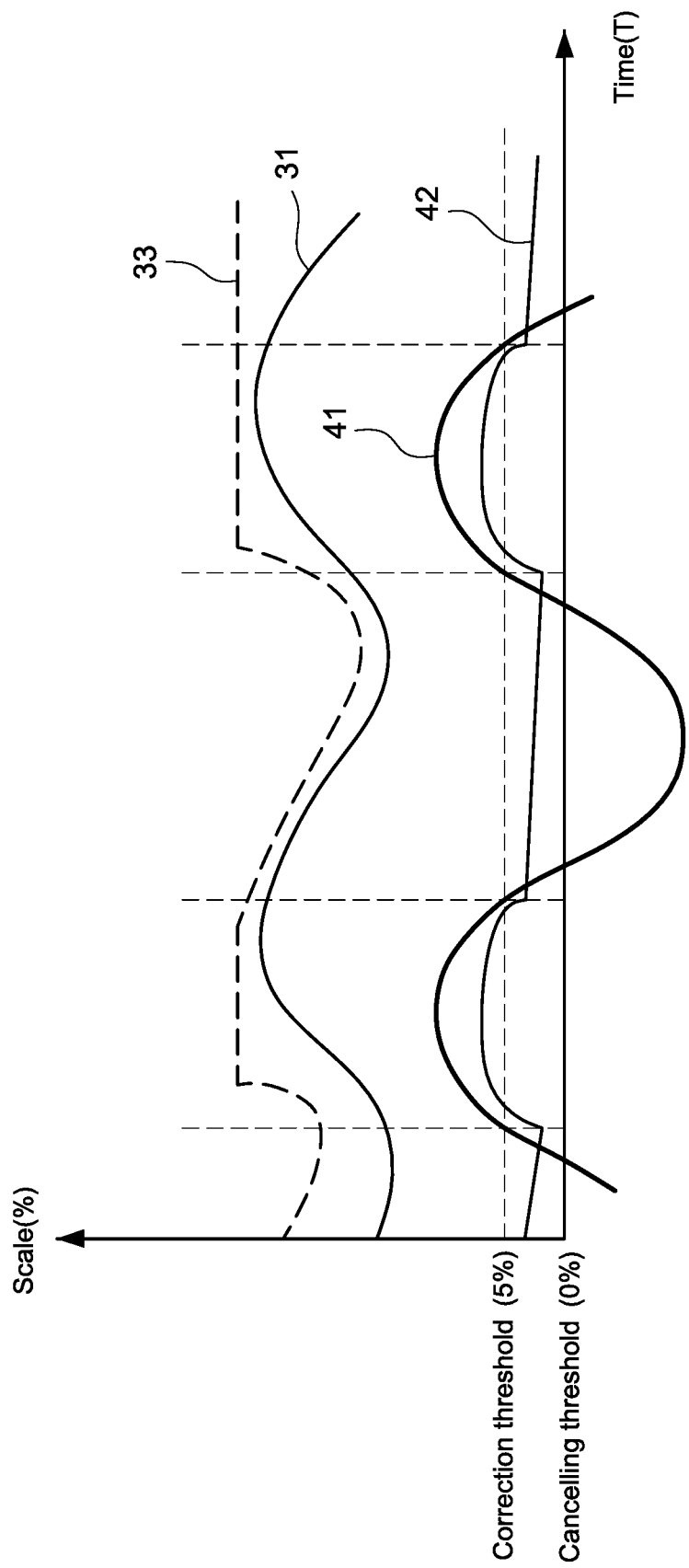
FIG. 11 is the waveform showing the signal change according to the third embodiment.

FIG. 11 is the waveform showing the signal change according to the third embodiment.

FIG. 11 shows the repeated change of the original throttle signal 31 between 50% and 100%. Namely, the driver repeatedly controls the throttle to accelerate and releases the throttle, just like simulating a scenario that riding in the traffic jam. In the embodiment shown in FIG. 11, the correction threshold is 5% of the rated upper bound for the throttle signal, and the cancelling threshold is 0% of the rated upper bound for the throttle signal. But above example is not limitation of the present invention.

As shown in FIG. 11, even the throttle variation rate 41 is smaller than the cancelling threshold (the throttle compensation value 42 begins to reduce in a downward stepped manner), the weight calculator 245 will re-start and update the throttle compensation value 42 when each time the throttle variation rate 41 abruptly changes to exceed the correction threshold. Therefore, the electrical motorbike 2 again obtains larger output torque and the rider has strong feeling of acceleration whenever he wants.

In the present invention, the rider may select through the human-machine interface (HMI, not shown) of the electrical motorbike 2 to enable/disable the compensation function. If the rider wants to disable the compensation function, the electrical motorbike 2 operates with linear power curve shown in FIG. 1B to have better safety and manipulation as well as energy saving. If the rider wants to enable the compensation function, the electrical motorbike 2 will have thrusting acceleration as jet engine.

Figure 12:
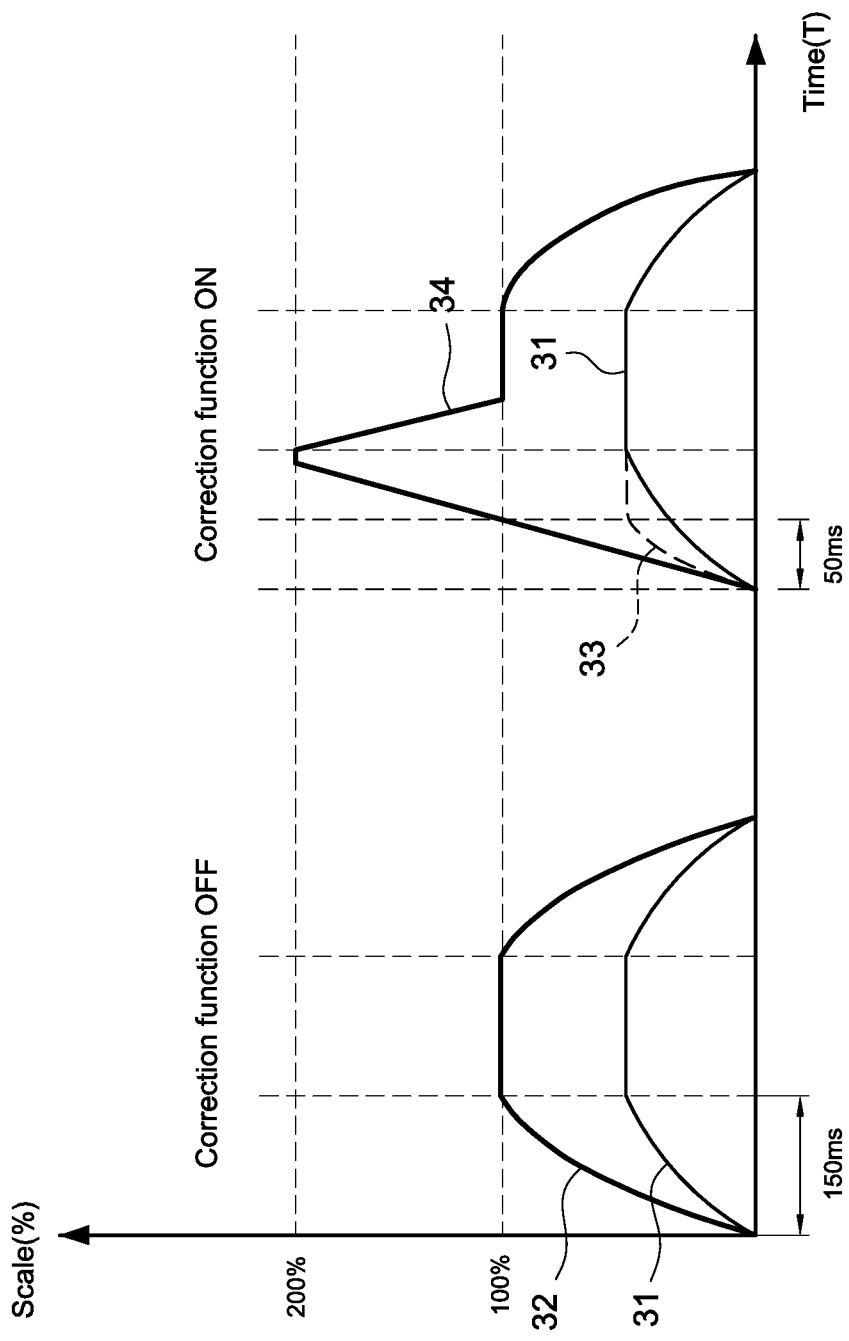
FIG. 12 is the waveform showing the signal change according to the fourth embodiment.

FIG. 12 is the waveform showing the signal change according to the fourth embodiment. FIG. 12 shows the output torque response comparison between the enabled compensation function and disabled compensation function for the electrical motorbike 2.

As can be seen in left part of FIG. 12, when the compensation function of the electrical motorbike 2 is disabled (turned OFF), the output torque (the original output torque 32) is directly proportional to the original throttle signal 31. In the embodiment shown in FIG. 12, the original output torque 32 reaches 100% of the rated upper bound at 150 ms.

When the compensation function of the electrical motorbike 2 is enabled (turned ON), the output torque (the new output torque 34) changes with the compensated new throttle signal 33. As can be seen in right part of FIG. 12, the new output torque 34 fast reaches 150% of the rated upper bound at 50 ms and can even reach 200% of the rated upper bound with the presence of the throttle variation rate (namely, the above-mentioned overdrive operation). When the throttle variation rate is zero (namely the original throttle signal 31 is horizontal), the load of the electrical motorbike 2 can be mildly reduced through the weight calculator 245 (namely reducing the last throttle compensation value gradually in a downward stepped manner) to prevent the stalling feeling of the rider in throttle-releasing operation.

To sum up, the present invention compensates the output torque with respect to the throttle variation rate such that the electrical motorbike can have thrusting acceleration as the fuel-based motorbike with engine chip. Besides, the correction coefficient is set based on various factors and controllable. Therefore, the electrical motorbike can have both comfortable ride, safety and energy saving while the output torque thereof is compensated.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A system for compensating acceleration of electrical motorbike, the system comprising:
    a throttle unit receiving an operation magnitude and configured to generate an original throttle signal accordingly;
    a processor electrically connected to the throttle unit and comprising an acceleration compensation module, a throttle compensation module and a torque controller, wherein the acceleration compensation module is configured to receive the original throttle signal, calculate a throttle variation rate based on a change in the operation magnitude, and calculate a throttle compensation value based on the throttle variation rate; the throttle compensation module adds the throttle compensation value to the original throttle signal to obtain a new throttle signal, and the torque controller is configured to generate a torque command based on the new throttle signal; and
    an electro-mechanic assembly electrically connected to the processor and receiving the torque command from the processor, the electro-mechanic assembly runs corresponding to the torque command;
    wherein the acceleration compensation module is configured to continually monitor the change in the operation magnitude of the throttle unit, calculate the throttle variation rate and compare the throttle variation rate with a correction threshold, the acceleration compensation module is configured to start acceleration compensation and calculate the throttle compensation value when the throttle variation rate is larger than or equal to the correction threshold,
    wherein the correction threshold is computed in accordance with a rated upper bound of the original throttle signal; and
    wherein the acceleration compensation module is configured to obtain an average of the throttle variation rate through a moving averaging procedure, and calculate the throttle compensation value based on the average of the throttle variation rate.

2. The system in claim 1, wherein the electro-mechanic assembly is configured to output a torque which is between 100% and 300% of a rated upper bound based on the torque command.

3. The system in claim 1, wherein the acceleration compensation module is configured to compare the throttle variation rate with a cancelling threshold when the throttle variation rate is smaller than the correction threshold, wherein the acceleration compensation module is configured to decrease a last throttle compensation value gradually in a downward stepped manner to zero when the throttle variation rate is smaller than the cancelling threshold, wherein the acceleration compensation module is configured to maintain the last throttle compensation value for a maintaining time period and decrease the last throttle compensation value gradually to zero after the maintaining time period when the throttle variation rate is larger than or equal to the cancelling threshold, wherein the cancelling threshold is smaller than the correction threshold.

4. The system in claim 1, wherein the acceleration compensation module is configured to receive the original throttle signal from the throttle unit, and perform a derivative operation to the original throttle signal to calculate the throttle variation rate.

5. The system in claim 4, wherein the acceleration compensation module is configured to multiply the average of the throttle variation rate with a control gain to calculate the throttle compensation value.

6. The system in claim 5, wherein a preset value of the control gain is between 0.6 and 1.0.

7. The system in claim 4, wherein the acceleration compensation module further comprises a weight calculator, the weight calculator is configured to calculate a correction coefficient based on a control gain and at least one calculation coefficient corresponding to at least one environment factor, wherein the weight calculator is configured to calculate the throttle compensation value by multiplying the average of the throttle variation rate with the correction coefficient.

8. The system in claim 7, wherein the at least one environment factor comprises at least one of a set consisted of a driver status, a driving speed, a vehicle mode, a battery output status and a brake status.

9. The system in claim 8, wherein the environment factor corresponding to the driving speed comprises a low-medium speed status and a high speed status, and the calculation coefficient corresponding to the environment factor of low-medium speed status is larger than the calculation coefficient corresponding to the environment factor of low-medium speed status; wherein the environment factor corresponding to the vehicle mode comprises an economic mode and a power mode, and the calculation coefficient corresponding to the environment factor of the power mode is larger than the calculation coefficient corresponding to the environment factor of the economic mode; wherein the environment factor corresponding to the battery output status comprises a remaining battery capacity, a battery temperature and a battery voltage, the calculation coefficient corresponding to environment factors of battery output status is zero when a remaining capacity of the battery is smaller than a capacity threshold, a temperature of the battery is higher than an over-temperature threshold, or the battery voltage is lower than a low-voltage threshold.

10. A method for compensating acceleration of electrical motorbike, the method applied to an electrical motorbike which has a throttle unit, a processor and an electro-mechanic assembly, and comprising steps of:
a) the throttle unit receiving an operation magnitude and generating an original throttle signal accordingly;
b) an acceleration compensation module of the processor receiving the original throttle signal and calculating a throttle variation rate based on a change in the operation magnitude, wherein a moving averaging procedure is performed to obtain an average of the throttle variation rate;
c) comparing the throttle variation rate with a correction threshold, wherein the correction threshold is computed in accordance with a rated upper bound of the original throttle signal;
d) the acceleration compensation module calculating a throttle compensation value based on the average of the throttle variation rate when the throttle variation rate is larger than or equal to the correction threshold;
e) a throttle compensation module of the processor adding the throttle compensation value to the original throttle signal to generate a new throttle signal;
f) a torque controller of the processor generating a torque command based on the new throttle signal;
g) the electro-mechanic assembly receiving the torque command from the processor and running corresponding to the torque command; and
h) repeating the steps a) to g) until the electrical motorbike is turned off.

11. The method in claim 10, wherein the electro-mechanic assembly has a rated upper bound for outputting a torque, the torque command controls the electro-mechanic assembly to output the torque between 100% and 300% of the rated upper bound.

12. The method in claim 10, further comprising steps of:
c1) after the step c), comparing the throttle variation rate with a cancelling threshold when the throttle variation rate is smaller than the correction threshold, wherein the cancelling threshold is smaller than the correction threshold;
c2) decreasing the last throttle compensation value gradually to zero when the throttle variation rate is smaller than the cancelling threshold, and then the step e) is performed with the decreased throttle compensation value during decreasing of the throttle compensation value; and
c3) maintaining the last throttle compensation value for a maintaining time period when the throttle variation rate is larger than or equal to the cancelling threshold; decreasing the last throttle compensation value gradually to zero when the maintaining time period elapses, and then performing the step e) with the maintained throttle compensation value or the decreased throttle compensation value.

13. The method in claim 10, wherein in the step b) a derivative operation is performed to the original throttle signal to calculate the throttle variation rate.

14. The method in claim 13, wherein in the step d) the average of the throttle variation rate is multiplied with a control gain to obtain the throttle compensation value.

15. The method in claim 14, wherein a preset value of the control gain is between 0.6 and 1.0.

16. The method in claim 13, wherein in the step d) a weight calculator calculates a correction coefficient based on a control gain and at least one calculation coefficient corresponding to at least one environment factor, wherein the weight calculator calculates the throttle compensation value by multiplying the average of the throttle variation rate with the correction coefficient.

17. The method in claim 16, wherein the at least one environment factor comprises at least one of a set consisted of a driver status, a driving speed, a vehicle mode, a battery output status and a brake status.

18. The method in claim 17, wherein the environment factor corresponding to the driving speed comprises a low-medium speed status and a high speed status, and the calculation coefficient corresponding to the environment factor of low-medium speed status is larger than the calculation coefficient corresponding to the environment factor of low-medium speed status; wherein the environment factor corresponding to the vehicle mode comprises an economic mode and a power mode, and the calculation coefficient corresponding to the environment factor of the power mode is larger than the calculation coefficient corresponding to the environment factor of the economic mode; wherein the environment factor corresponding to the battery output status comprises a remaining battery capacity, a battery temperature and a battery voltage, the calculation coefficient corresponding to environment factors of battery output status is zero when a remaining capacity of the battery is smaller than a capacity threshold, a temperature of the battery is higher than an over-temperature threshold, or the battery voltage is lower than a low-voltage threshold.

* * * * *